United States Patent [19]
McGourthy, Jr. et al.

[11] Patent Number: 6,015,032
[45] Date of Patent: Jan. 18, 2000

[54] DRIVE WITH SELF-ACTUATING CLUTCH AND BRAKE

[75] Inventors: John D. McGourthy, Jr., Mequon; Jon A. DeBoer, Jr., Port Washington, both of Wis.

[73] Assignee: John D. McGourthy, Sr., Mequon, Wis.

[21] Appl. No.: 08/927,297

[22] Filed: Sep. 11, 1997

[51] Int. Cl.[7] .................................................. F16D 13/76
[52] U.S. Cl. ............................ 192/14; 192/16; 192/18 R
[58] Field of Search .............................. 192/14, 16, 13 A, 192/70.16, 70.22, 70.15, 43.2, 48.6, 18 R, 54.5

[56] References Cited

U.S. PATENT DOCUMENTS

| | | | |
|---|---|---|---|
| 570,765 | 11/1896 | Patridge | 192/18 R X |
| 1,125,555 | 1/1915 | Kemp et al. | 192/70.15 |
| 2,381,545 | 8/1945 | Kirsy . | |
| 2,555,400 | 6/1951 | De Remer . | |
| 2,574,617 | 11/1951 | Bryant | 192/14 |
| 2,976,746 | 3/1961 | Flannery . | |
| 3,209,873 | 10/1965 | Suzuki | 192/18 R |
| 3,490,569 | 1/1970 | Reed | 192/18 R |
| 3,584,482 | 6/1971 | Brucken | 68/23 |
| 4,231,237 | 11/1980 | Bochan . | |
| 4,262,789 | 4/1981 | Collins | 192/70.15 X |
| 4,291,556 | 9/1981 | Mason . | |
| 4,372,433 | 2/1983 | Mitchell et al. | 192/18 R |
| 4,466,233 | 8/1984 | Thesman | 192/14 X |
| 4,524,853 | 6/1985 | Nagai | 192/18 R |
| 4,803,855 | 2/1989 | Kennedy . | |
| 4,910,979 | 3/1990 | Burk et al. . | |
| 4,969,341 | 11/1990 | Burk et al. . | |
| 5,000,016 | 3/1991 | Burk et al. . | |
| 5,172,573 | 12/1992 | Sharp et al. | 68/23.7 |
| 5,209,085 | 5/1993 | Brien . | |
| 5,222,242 | 6/1993 | Choi et al. . | |
| 5,509,284 | 4/1996 | Hauser . | |

*Primary Examiner*—Rodney H. Bonck
*Assistant Examiner*—Ha Ho
*Attorney, Agent, or Firm*—Andrus, Sceales, Starke & Sawall

[57] ABSTRACT

A drive mechanism (20, 120) includes a driving rotary member (22, 122), a driven rotary member (24, 124), and a clutch (26, 126) operatively coupled between the driving member and the driven member and responsive to rotation of the driving member to automatically engage and rotate the driven member after a given amount of rotation of the driving member. The clutch is self-actuated in response to rotation of the driving member. A brake (36, 136) has a braking condition stopping rotation of the driven member, and a released condition permitting rotation of the driven member. Axial movement of the clutch face (34, 134) from its released position to its driving position also actuates the brake from its braking condition to its released condition. The drive is bidirectional, and is particularly useful in a nutational washing machine.

4 Claims, 6 Drawing Sheets

DRIVE WITH SELF-ACTUATING CLUTCH AND BRAKE

BACKGROUND AND SUMMARY

The invention relates to a drive mechanism, and to more particularly to a drive providing in a single unit any or all of the desirable features of a bidirectional drive, an automatically self-actuated clutch with limited lost motion, and automatic self-braking. The invention is particularly useful in application to a washing machine with nutational agitation.

The invention arose during development efforts directed toward a drive mechanism having a nutational agitation cycle, as opposed to an oscillatory agitation cycle. In a washing machine having an oscillatory agitation cycle, the central finned agitator within the basket or washtub rotates back and forth in opposite directions to agitate and clean the clothes in the wash water in the basket. In a nutational washing machine, the central agitator does not oscillate back and forth in opposite rotational directions, but instead rotates in a single direction and is eccentrically oriented to define and sweep through an inverted cone shaped path during rotation, to agitate and wash the clothes in the wash water in the basket. The present invention provides a simple and efficient drive mechanism for such application.

In the present invention, the noted nutational eccentric agitator is rotated in one direction through a simple nonclutched direct drive from a driving rotary member, for example which is driven by an electric motor.

The present invention provides in combination with the noted simple direct drive, a self-actuated lost motion automatic clutch for the spin dry cycle. Upon completion of the wash and rinse cycles, it is desired to have a spin cycle to partially dry the clothes. The heavy wet clothes in the basket present a high inertia load, and it is not desirable to attempt to rotate the basket from a dead start of the driving electric motor. The present invention addresses and solves this need in a particularly simple and efficient manner, and provides the noted self-actuating lost motion clutch allowing partial starting rotation of the electric motor before engagement with the high inertia basket load. The direction of rotation of the driving rotary member for the wash cycle is opposite to the direction of rotation of such driving rotary member for the spin cycle. The drive mechanism is bidirectional, and provides direct nonclutched drive in wash direction and automatic self-actuated clutching in the spin-dry direction.

The invention also provides in combination in a single unit a self-actuated brake which automatically engages and stops rotation of the basket upon disengagement of the clutch. Conversely, engagement of the clutch substantially simultaneously disengages the brake, in response to rotation of the driving member.

The invention has other applications beyond washing machines, where the above noted and below described features are desirable.

DETAILED DESCRIPTION

FIGS. 1–5 show a drive mechanism 20 including a driving rotary member 22, a driven rotary member 24, and a clutch 26 operatively coupled between the driving member and the driven member and responsive to rotation of driving member 22 to automatically engage and rotate driven member 24 after a given amount of rotation of driving member 22. Driving member 22 is in turn driven by a motive member 28, for example an electric motor, by a drive belt 30 therebetween. Clutch 26 is self-actuated in response to rotation of driving member 22, to be described.

Driving member 22 and driven member 24 are axially spaced from each other along the axis of shaft 32. Clutch 26 includes an axially movable clutch face 34, FIG. 2, having a released position, FIG. 3, axially spaced from the driven member, and having a driving position, FIGS. 4 & 5, engaging the driven member. The clutch face is axially moved from the released position to the driving position by rotation of driving member 22. The drive further includes in combination a brake 36 having a braking condition, FIGS. 3 & 4, stopping rotation of the driven member, and having a released condition, FIG. 5, permitting rotation of the driven member. Axial movement of clutch face 34 from its released position, FIG. 3, to its driving position, FIG. 5, also actuates brake 36 from its braking condition, FIG. 3, to its released condition, FIG. 5, to be described.

Figure 3:
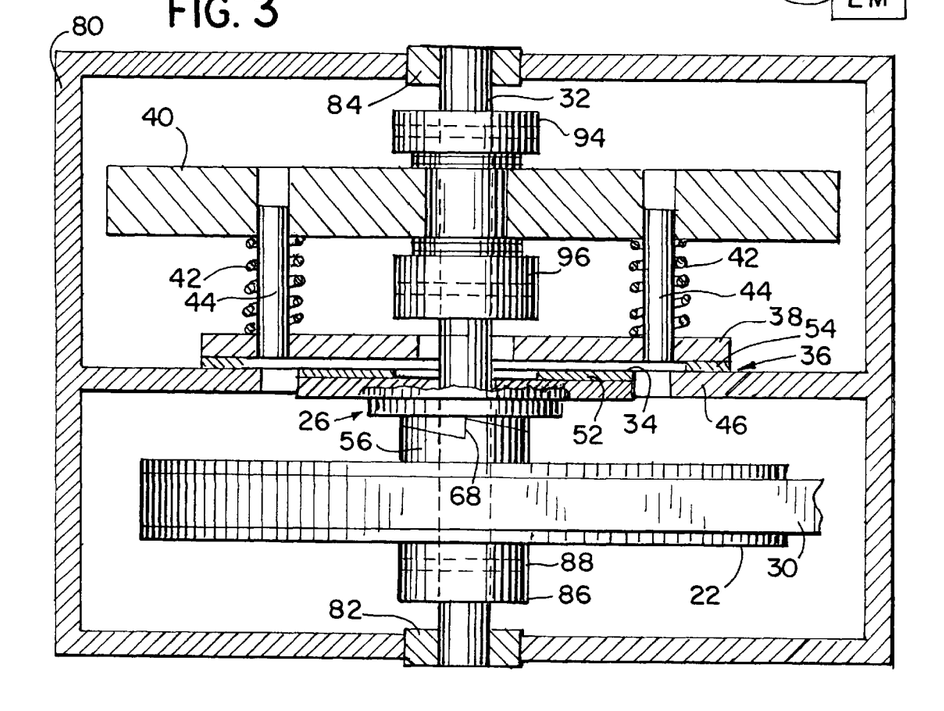
FIG. 3 is a side view, partially in section, of the drive mechanism of FIG. 1.

Driven member 24 includes an axially movable pressure plate 38, a load member 40, and resilient biasing brake springs 42 biasing pressure plate 38 axially away from load member 40 along respective guide pins 44. Brake 36 is actuated from its braking position, FIG. 3, to its released position, FIG. 5, by axial movement of pressure plate 38 from a braking position engaging a brake shoe 46, to a released position disengaging the brake shoe, FIG. 5. At initial rotation of driving member 22, i.e. at start-up of electric motor 28 from a dead stop, clutch face 34, FIG. 3, is axially spaced from pressure plate 38, and pressure plate 38 is in engagement with brake shoe 46. After a given amount of rotation of driving member 22, FIG. 4, clutch face 34 engages pressure plate 38. Further rotation, FIG. 5, of driving member 22 beyond the noted given amount of rotation automatically disengages pressure plate 38 from brake shoe 46 and moves pressure plate 38 axially away from brake shoe 46 and axially toward load member 40, compressing brake springs 42. In preferred form, the noted given amount of rotation is less than one-half turn of driving member 22, which preferably corresponds to a plurality of revolutions of the motor shaft of electric motor 28, depending on the pulley ratio reduction provided by different sized pulleys 22 and 29 around which drive belt 30 is driven.

Figure 1:
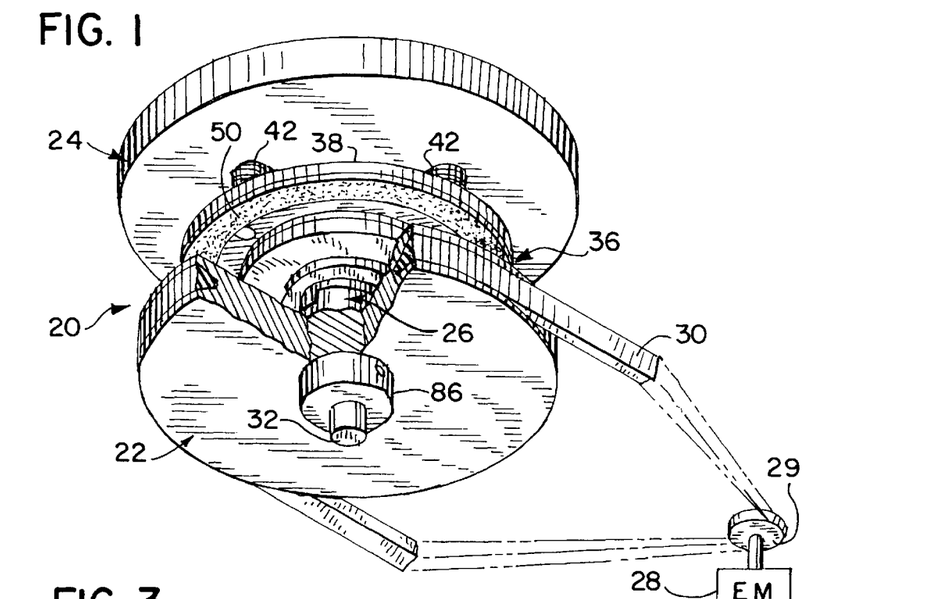
FIG. 1 is a perspective view, partially in section, of a drive mechanism constructed in accordance with the invention.
Figure 2:
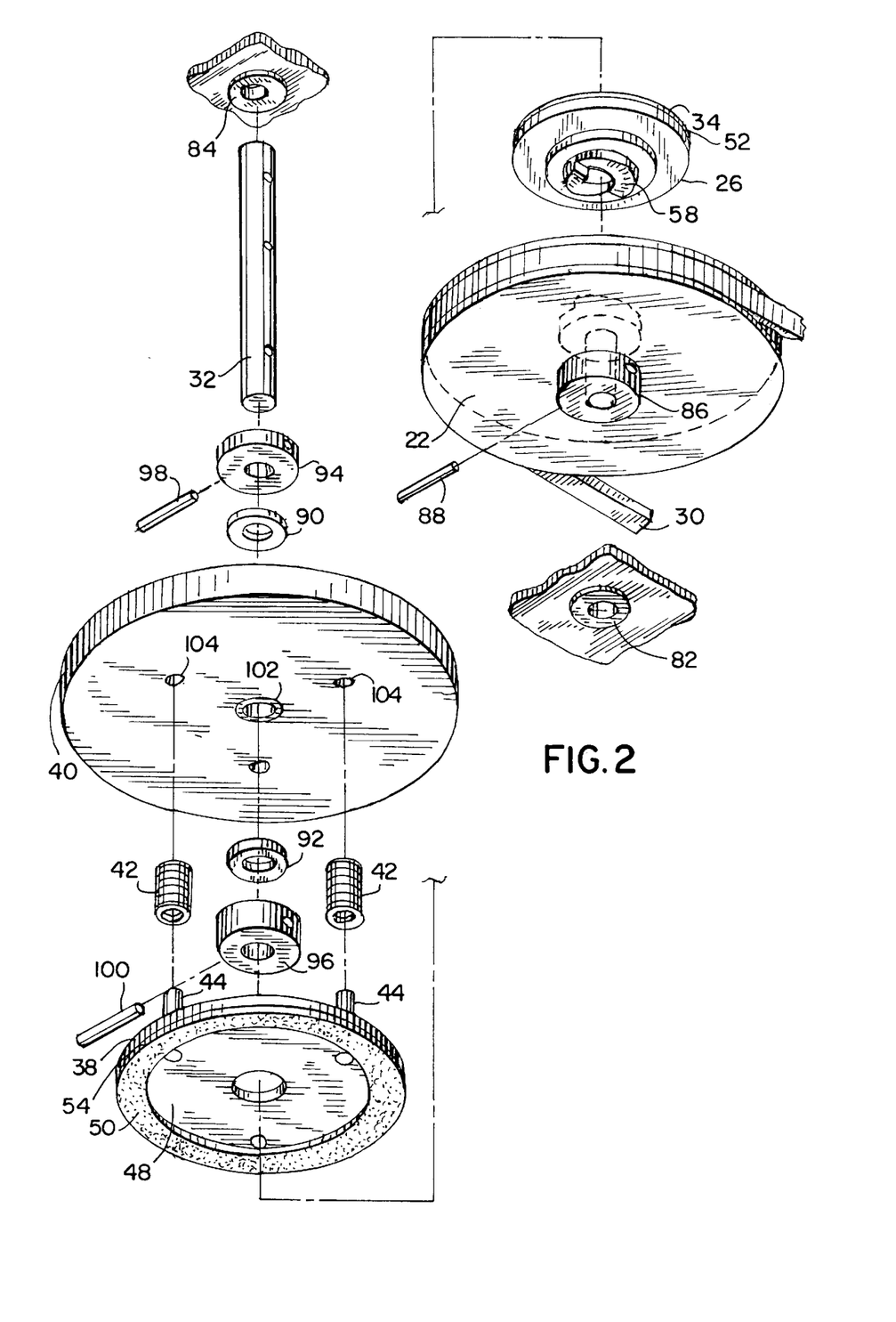
FIG. 2 is an exploded perspective view of the structure of FIG. 1.
Figure 2A:
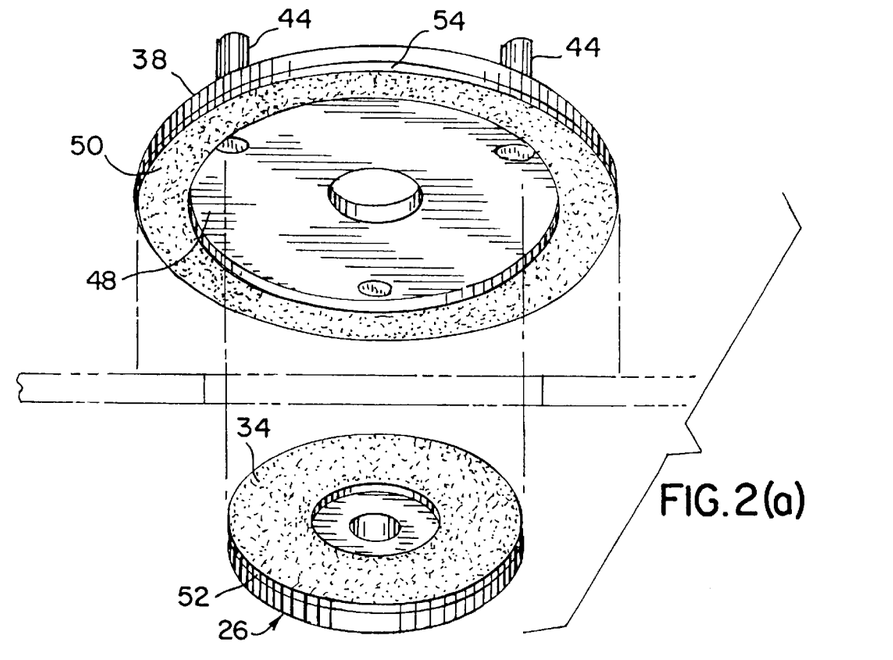
FIG. 2a is a perspective view of a portion of the structure of FIG. 2
Figure 2B:
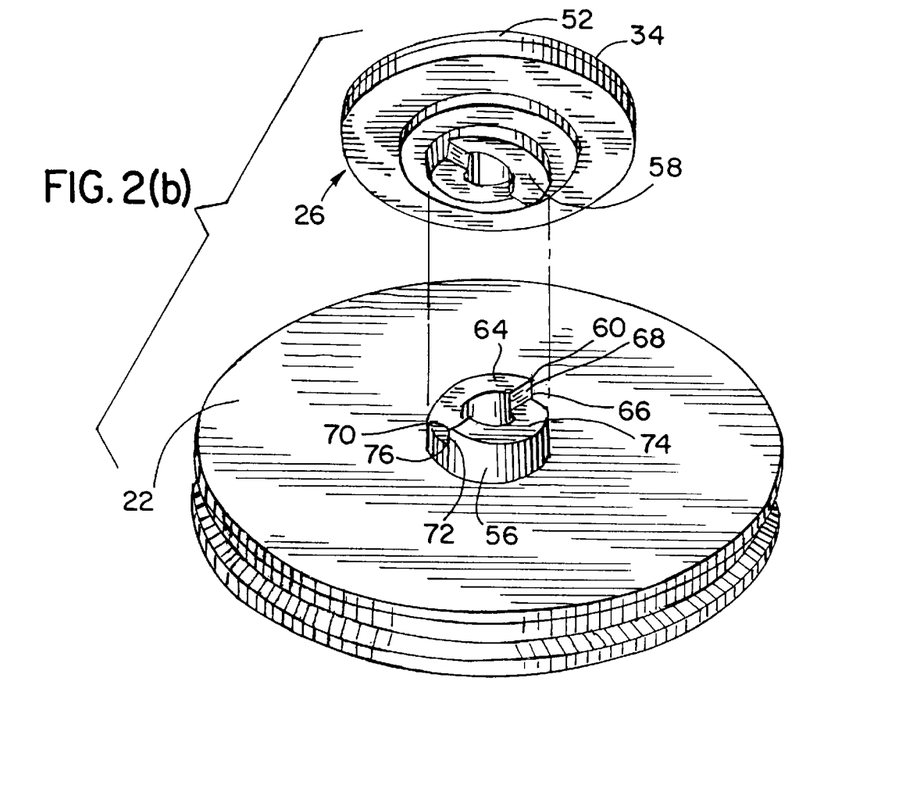
FIG. 2b is a perspective view of a portion of the structure of FIG. 2.

Pressure plate 38 has a first friction surface 48, FIG. 2, engageable with clutch face 34. Pressure plate 38 has a second friction surface 50 engageable with brake shoe 46. It is preferred that friction material be provided between the rubbing surfaces of the clutch and between the rubbing surfaces of the brake. In the embodiment of FIGS. 1–5, the clutch friction material 52 is bonded to clutch 26 to provide clutch face 34, and the brake friction material 54 is bonded to pressure plate 38. The friction material may alternatively be bonded to the other of the rubbing surfaces. During rotation of driving member 22 through the noted given amount of rotation, FIGS. 4 and 5, friction surface 50 and brake shoe 46 disengage substantially simultaneously with engagement of friction surface 48 and clutch face 34. Friction surface 50 is radially outward of friction surface 48 relative to the axis of rotation of driven member 24. Friction surface 48 is a first annulus, and friction surface 50 is a second annulus concentric to the first annulus.

Driving member 22 has a cam 56 formed or welded thereon and rotating with the driving member to axially engage clutch 26 and disengage brake 46. The clutch includes a mating arcuate camming surface 58, FIGS. 2 and 2b, between cam 56 of driving member 22 and clutch face 34 of the clutch such that rotation of driving member 22 axially cams clutch 26 and clutch face 34 toward and into engagement with friction surface 48 of pressure plate 38 of driven member 24. The camming surfaces have a release lobe at a high point 60, such that the camming surface cams clutch face 34 into engagement with and rotates the driven member before the lobe is reached, FIG. 4. If driven member 24 is stopped by a foreign object or the like, driving member 22 may continue to rotate until the high point lobe on the cam surface is reached, whereafter clutch face 34 may move axially away from pressure plate 38, with the cycle repeating upon continued rotation of driving member 22. This protects a motive member, such as electric motor 28, driving the driving member 22. For example, if the driven member is connected to the basket in a washing machine, and a towel or the like gets wedged between the basket and the frame during the spin cycle, the electric drive motor may burn-out if it continues to attempt to rotate the basket. The noted camming clutch structure enables slippage, to thus prevent such burn-out. Springs 42 provide take-up compensation permitting continued axial movement of clutch face 34 and pressure plate 38 toward load member 40 if rotation of driven member 24 is stopped by the noted foreign object or the like, until the high point cam lobe is reached. Springs 42 are brake springs biasing pressure plate 38 away from load member 40 to provide the noted braking function. Such springs additionally function as the noted take-up compensation springs enabling slippage in a stuck basket situation, preventing motor burn-out.

Figure 4:
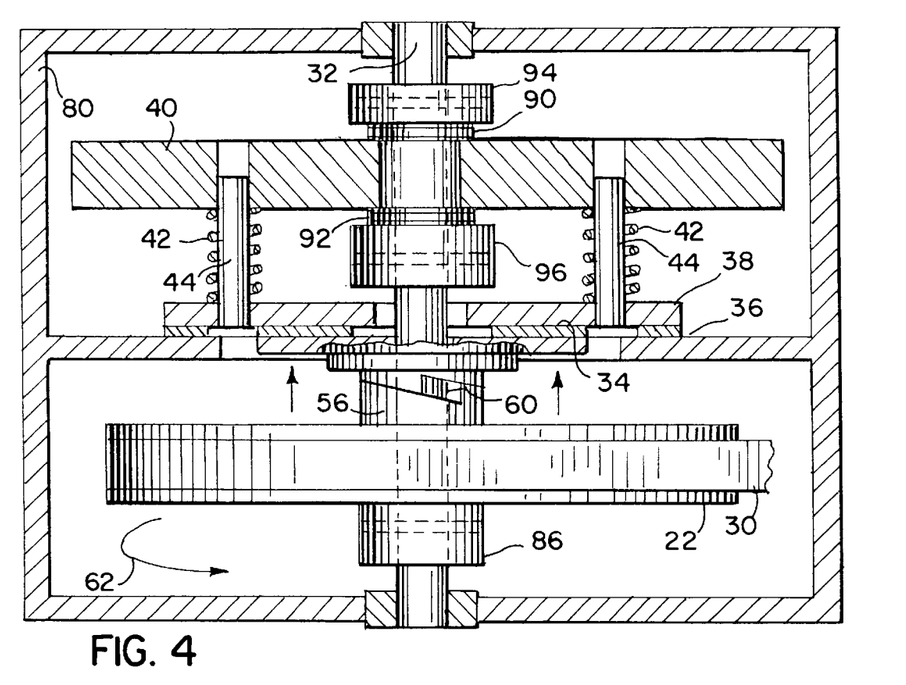
FIG. 4 is like FIG. 3 and shows further sequential operation.

Drive mechanism 20 is bidirectional and provides in combination in a single unit a limited lost motion clutched drive of driven member 24 in one direction, as shown at arrow 62 in FIG. 4, and a nonclutched direct drive of driven shaft member 32 in both the one direction and also in the opposite direction. Clutch 26 is operative in the noted one rotary direction 62 between driving member 22 and driven member 24, and is responsive to the noted one direction of rotation of driving member 22 as shown at arrow 62 to engage pressure plate 38 of driven member 24 and rotate the driven member after a given amount of rotation, FIG. 4, of driving member 22 in the noted one direction of rotation thereof 62. The drive mechanism also includes a direct drive operative in the other rotary direction opposite to direction 62 between driving member 22 and driven member 24, and is responsive to such opposite direction of rotation of driving member 22 to rotate driven shaft member 32 without clutching. The slope and taper of camming surface 58 is adjustable and controls the degree of rotation in the noted given amount to in turn control the amount of lost motion of driving member 22 before clutched engagement with driven member 24, FIG. 4. The camming surface climbs along a profiled frontside 64, FIG. 2b, to high point lobe 60, and then falls to a low point 66 along a backside 68. Driving member 22 in the noted one direction of rotation 62 drives the driven member along the camming surface frontside 64. The camming surfaces include a pair of diametrically opposite high point lobes 60 and 70, FIG. 2b, a pair of diametrically opposite backsides 68 and 72, and a pair of inclined camming ramp frontsides 64 and 74 extending from a respective low point 66 and 76 at the bottom of a respective backside 68 and 72 to a diametrically opposite high point lobe 60 and 70. Shaft 32 is directly driven by driving member 22 and rotates therewith in each direction of rotation of driving member 22 without lost motion therebetween.

Figure 5:
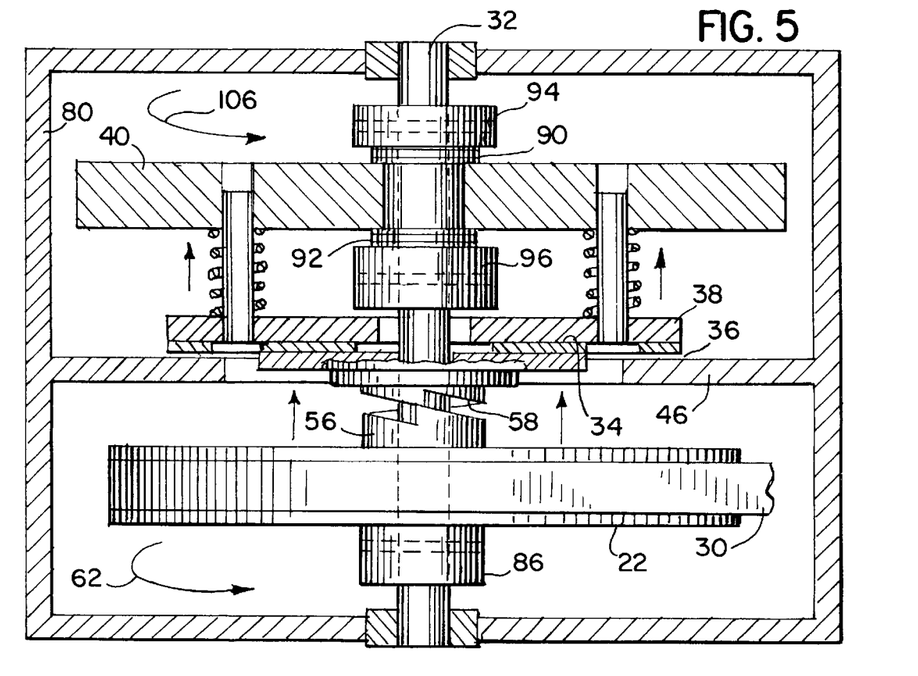
FIG. 5 is like FIG. 4 and shows further sequential operation.

FIGS. 3–5 show the invention mounted in a test rig subframe 80 developed for testing of the invention. Rotary shaft 32 is journaled in the subframe at bearings 82, 84. Driving member 22 has the noted cam 56 formed or welded on one side thereof and has bushing 86 formed or welded on the other side thereof, and is mounted to shaft 32 by set pin 88 extending through bushing 86 and shaft 32, such that rotation of driving member 22 rotates shaft 32. Shaft 32 in turn is connectable to the agitator shaft of the washing machine to rotate same. The agitator shaft is finned and is mounted at an angle or eccentric relative to the axis of shaft 32 such that the agitator shaft nutates to sweep out an inverted cone during its path of travel, which agitates and washes the clothes in the basket. The agitating washing cycle is in the direction of rotation of shaft 32 opposite to the arrow shown at 62 in FIG. 4, and is provided by the noted direct drive engagement. During such wash cycle, brake 36 is in its braking condition, with friction surface 50 of pressure plate 38 engaging brake shoe 46, such that pressure plate 38 and load member 40 of driven member 24 do not rotate. Load member 40 is mounted on shaft 32 between washers 90 and 92 which in turn are between respective bushings 94 and 96 which are nonrotationally mounted to shaft 32 by respective set pins 98 and 10 extending through respective bushings 94 and 96 and shaft 32. Load member 40 permits rotation of shaft 32 therein at bearing 102. Pins 44 are rigidly mounted to pressure plate 38 by welding, and extend axially toward and into respective holes 104 in load member 40, such that rotation of pressure plate 38 also rotates load member 40, irrespective of any rotation of shaft 32. Likewise, when rotation of pressure plate 38 and load member 40 is stopped by brake 36, FIG. 3, shaft 32 may rotate within load member 40. This enables the noted washing agitation cycle. For the spin dry cycle, driving member 22 is rotated in the direction shown at 62 in FIG. 4, actuating clutch 26 to in turn engage pressure plate 38, disengage brake 36, and rotate pressure plate 38 and load member 40 as shown at arrow 106 in FIG. 5, spinning both shaft 32 and load member 40. The load member 40 is to be attached to the basket of the washing machine, to provide the noted spin dry cycle. The noted lost motion clutching action enables a limited amount of rotation of driving member 22 and electric motor 28 before driving engagement with the high inertia load of the basket having wet clothes therein.

Pressure plate 38 is axially movable and rotationally nonmovable relative to load member 40. Pressure plate 38 has a clutching surface 48 and a braking surface 50. Clutch 26 is operatively coupled between driving member 22 and driven member 24, and has a clutch face 34 responsive to rotation of driving member 22 to axially engage clutching surface 48 of pressure plate 38 and rotate the driven member after a given amount of rotation of the driving member providing lost motion therebetween. Brake 36 is engageable with braking surface 50 of the pressure plate to stop rotation of the driven member upon disengagement of the clutch. Engagement of the clutch is automatic in response to rotation of the driving member. Engagement of the brake is automatic in response to disengagement of the clutch. Rotation of driving member 22 in one direction 62 causes the automatic engagement of the clutch following the given amount of rotation and lost motion, whereafter the basket rotates, in addition to rotation of the agitator shaft connected to shaft 32. Rotation of driving member 22 in the direction opposite to arrow 62 provides disengagement of the clutch and engagement of the brake, whereafter only the agitator shaft rotates, due to rotation of shaft 32, and the basket remains stationary due to brake engagement.

As noted above, the subframe 80 of FIGS. 3–5 was developed for testing purposes. FIGS. 6–9 show a further embodiment suitable for application in a washing machine, including the provision of access to the driven member to permit attachment of the basket thereto. Drive mechanism 120 includes a driving rotary member 122 within cover or shroud 123, a driven rotary member 124, and a clutch 126 operatively coupled between the driving member and the driven member and responsive to rotation of driving member 122 to automatically engage and rotate driven member 124 after a given amount of rotation of driving member 122. Driving member 122 is in turn driven by a motive member, such as 28, FIG. 1. Clutch 126 is self-actuated in response to rotation of driving member 122, as above described in conjunction with clutch 26 and driving member 22.

Driving member 122 and driven member 124 are axially spaced from each other along the axis of shaft 132, which shaft has a first outer diameter at 131, and a smaller outer diameter at 133. Clutch 126 includes an axially movable clutch face 134 having a released position, FIG. 6, axially spaced from the driven member, and having a driving position, FIGS. 7 and 8, engaging the driven member. The clutch face is axially moved from the released position to the driving position by rotation of driving member 122. The drive further includes in combination a brake 136 having a braking condition, FIGS. 6 and 7, stopping rotation of the driven member, and having a released condition, FIG. 8, permitting rotation of the driven member. Axial movement of clutch face 134 from its released position, FIG. 6, to its driving position, FIG. 8, also actuates brake 136 from its braking condition, FIG. 6, to its released condition, FIG. 8.

Figure 6:
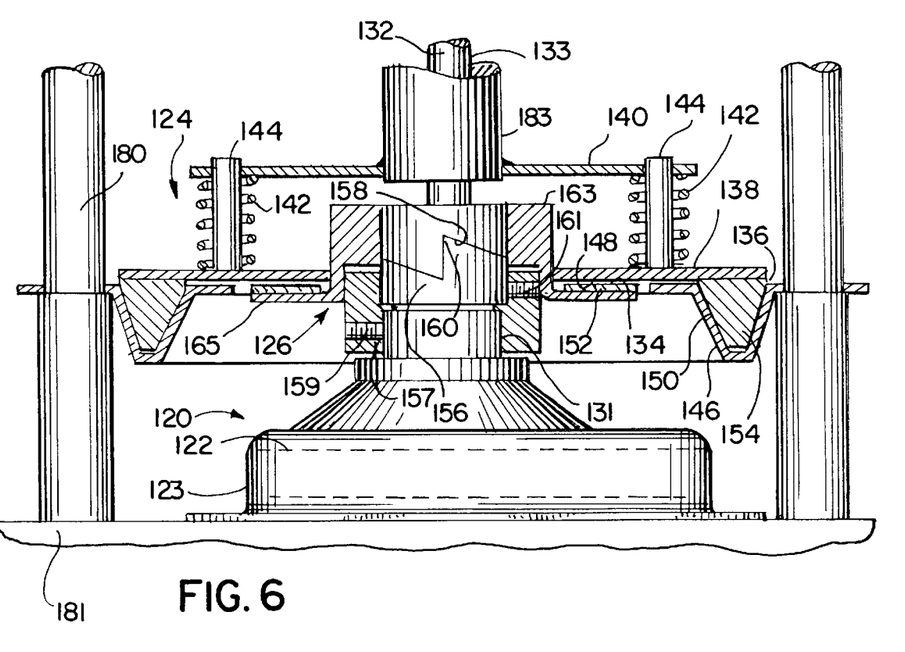
FIG. 6 is a view like FIG. 3 and shows an alternate embodiment.

Driven member 124 includes an axially movable pressure plate 138, a load member 140, and resilient biasing brake springs 142 biasing pressure plate 138 axially away from load member 140 along respective guide pins 144. Brake 136 is actuated from its braking position, FIG. 6, to its released position, FIG. 8, by axial movement of pressure plate 138 from a braking position engaging a brake shoe 146, to a released position disengaging the brake shoe, FIG. 8. At initial rotation of driving member 122, i.e. at start-up of the driving electric motor such as 28 from a dead stop, clutch face 134, FIG. 6, is axially spaced from pressure plate 138, and pressure plate 138 is in engagement with brake shoe 146. After a given amount of rotation of driving member 122, FIG. 7, clutch face 134 engages pressure plate 138. Further rotation, FIG. 8, of driving member 122 beyond the noted given amount of rotation automatically disengages pressure plate 138 from brake shoe 146 and moves pressure plate 138 axially away from brake shoe 146 and axially toward load member 140, compressing brake springs 142. As above noted, in preferred form, the noted given amount of rotation is less than one-half turn of driving member 122, which preferably corresponds to a plurality of revolutions of the motor shaft of the driving electric motor, for example depending upon the pulley ratio reduction provided by different sized pulleys around which drive belt 30 is driven.

Pressure plate 138 has a first friction surface 148 engageable with clutch face 134 Pressure plate 138 has a second friction surface 150 engageable with brake shoe 146. It is preferred that friction material be provided between the rubbing surfaces of the clutch and between the rubbing surfaces of the brake. In the embodiment of FIGS. 6-9, the clutch friction material 152 is bonded to clutch 126 to provide clutch face 134, and the brake friction material 154 is bonded to pressure plate 138. Brake friction material 154 is frustoconical in shape, and brake shoe 146 is matingly shaped, to provide increased braking surface area The friction material may alternatively be bonded to the other of the rubbing surfaces. During rotation of driving member 122 through the noted given amount of rotation, FIGS. 6 and 7, friction surface 150 and brake shoe 146 disengage substantially simultaneously with engagement of friction surface 148 and clutch face 134. Friction surface 150 is radially outward of friction surface 148 relative to the axis of rotation of driven member 124. Friction surface 148 is a first annulus, and friction surface 150 is a second annulus concentric to the first annulus.

Driving member 122 has a cam 156 mounted thereto at outer diameter portion 131 of shaft 132 by bushing 157 at set screws 159 and 161. Cam 156 rotates with driving member 122 to axially engage clutch 126 and disengage brake 146. The clutch includes a mating arcuate camming surface 158, FIGS. 6 and 9, between cam 156 of driving member 122 and clutch face 134 of the clutch such that rotation of driving member 122 axially cams clutch 126 and clutch face 134 toward and into engagement with friction surface 148 of pressure plate 138 of driven member 124. Camming surface 158 is part of a cam formed as part of or welded to a top-hat shaped clutch member 163 having an outer lower flange 165 to which friction material 152 is bonded to provide clutch face 134. The camming surfaces have a release lobe at a high point 160, as above described in conjunction with high point lobe 60, such that the camming surface cams clutch face 134 into engagement with and rotates the driven member before the lobe is reached, FIG. 7. If driven member 124 is stopped by a foreign object or the like, driving member 122 may continue to rotate until the high point lobe on the cam surface is reached, whereafter clutch face 134 may move axially away from pressure plate 138, with the cycle repeating upon continued rotation of driving member 122. This protects a motive member, such as electric motor 28, driving the driving member 122. For example, as above noted, if the driven member is connected to a wash tub basket in a washing machine, and a towel or the like gets wedged or stuck during the spin cycle, the electric motor will continue to rotate, due to the noted slippage of the camming surfaces past high point 160, allowing the basket to be stopped while the electric motor continues to rotate, thus preventing burnout of the motor. The noted camming clutch structure enables slippage, to thus prevent such burn-out. Springs 142 provide take-up compensation permitting continued axial movement of clutch face 134 and pressure plate 138 toward load member 140 if rotation of driven member 124 is stopped by the noted foreign object or the like, until the high point cam lobe is reached. Springs 142 are brake springs biasing pressure plate 138 away from load member 140 to provide the noted braking function. Such springs additionally function as the noted take-up compensation springs enabling slippage in a stuck basket situation, preventing motor burn-out.

Figure 7:
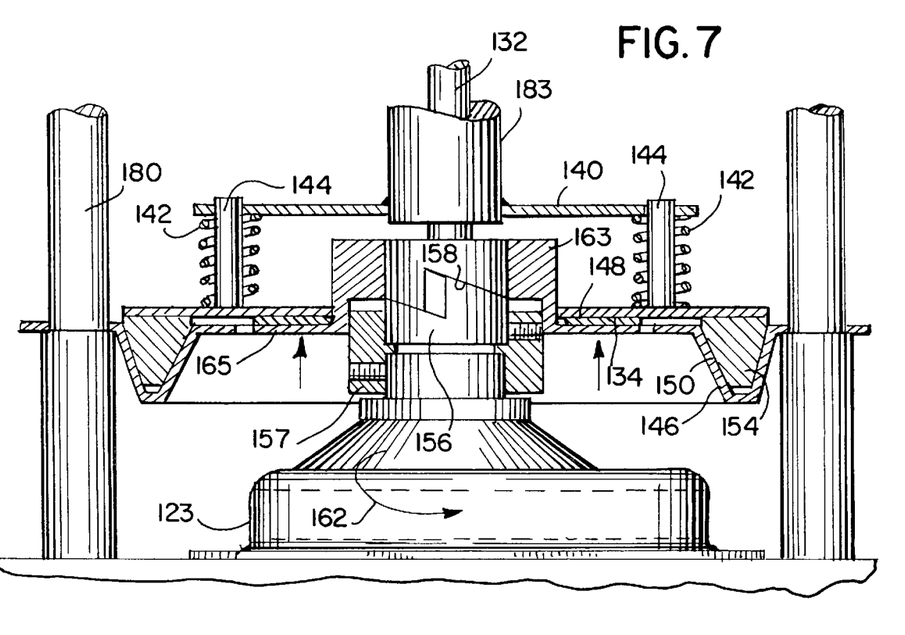
FIG. 7 is like FIG. 6 and shows further sequential operation.
Figure 8:
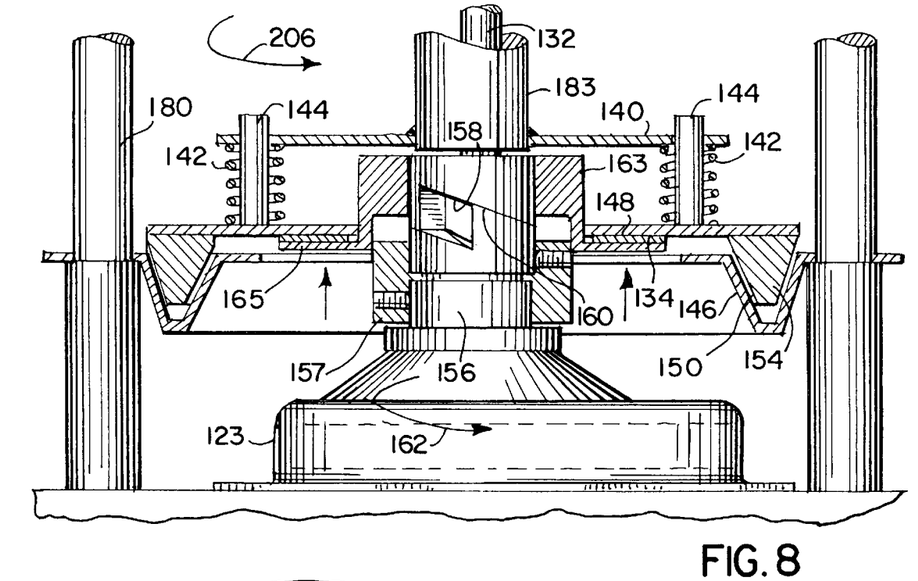
FIG. 8 is like FIG. 7 and shows further sequential operation.
Figures 9, 10:
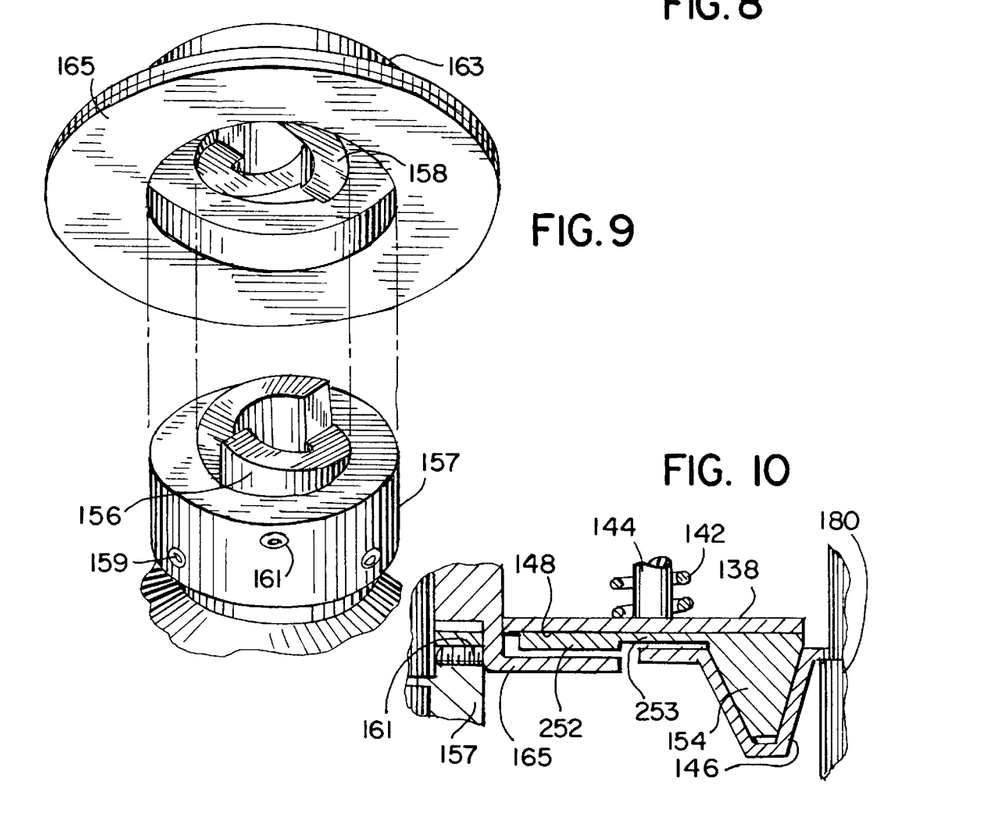
FIG. 9 is an exploded perspective view of a portion of the structure of FIG. 6.
FIG. 10 is an enlarged view similar to a portion of FIG. 6 and shows a further embodiment.

Drive mechanism 120 is bidirectional and provides in combination in a single unit a limited lost motion clutched drive of driven member 124 in one direction, as shown at arrow 162 in FIG. 8, and a nonclutched direct drive of driven member shaft 132 in direction 162 and also in the opposite direction. Clutch 126 is operative in the noted one rotary direction 162 between driving member 122 and driven member 124, and is responsive to the noted one direction of rotation of driving member 122 as shown at arrow 162 to engage pressure plate 138 of driven member 124 and rotate the driven member after a given amount of rotation, FIG. 7, of driving member 122 in the noted one direction of rotation 162 thereof. The drive mechanism 120 also includes a direct drive operative in the other rotary direction opposite to direction 162 between driving member 122 and driven member 124, and is responsive to such opposite direction of rotation of driving member 122 to rotate driven shaft member 132 without clutching. The slope and taper of camming surface 158 is adjustable and controls the degree of rotation in the noted given amount to in turn control the amount of lost motion of driving member 122 before clutched engagement with driven member 124, FIG. 7.

FIGS. 6–8 show the invention mounted in a subframe 180 for attachment to a washing machine 181. Load member 140 of driven member 124 has an annular shaft 183 welded thereto and concentric to shaft 132 at outer diameter portion 133. Shaft 132 is connectable to the agitator shaft of the washing machine to rotate same. The agitator shaft is finned and is mounted at an angle or eccentric relative to the axis of shaft 132 such that the agitator shaft nutates to sweep out an inverted cone during its path of travel, which agitates and washes the clothes in the basket. The agitating washing cycle is in the direction of rotation of shaft 132 opposite to the arrow shown at 162, and is provided by the noted direct drive engagement. During such wash cycle, brake 136 is in its braking condition, with friction surface 150 of pressure plate 138 engaging brake shoe 146, such that pressure plate 138, load member 140, and shaft 183 of driven member 124 do not rotate. Rotation of pressure plate 138 rotates load member 40 and shaft 183, irrespective of any rotation of shaft 132. Likewise, when rotation of pressure plate 138, load member 140, and shaft 183 is stopped by brake 136, shaft 132 may rotate within load member 140 and shaft 183. This enables the noted washing agitation cycle. For the spin dry cycle, driving member 122 is rotated in the direction shown at arrow 162, actuating clutch 126 to in turn engage pressure plate 138, disengage brake 136, and rotate pressure plate 138, load member 140, and shaft 183, as shown at arrow 206 in FIG. 8, spinning both shaft 132 and load member 140 and shaft 183. The shaft 183 of load member 140 is to be attached to the basket of the washing machine, to provide the noted spin dry cycle. The noted lost motion clutching action enables a limited amount of rotation of driving member 122 and electric motor 28 before driving engagement with the high inertial load of the basket having wet clothes therein.

Pressure plate 138 is axially movable and rotationally nonmovable relative to load member 140 and shaft 183. Pressure plate 138 has a clutching surface 148 and a braking surface 150. Clutch 126 is operatively coupled between driving member 122 and driven member 124, and has a clutch face 134 responsive to rotation of driving member 122 to axially engage clutching surface 148 of pressure plate 138 and rotate the driven member after a given amount of rotation of the driving member, providing lost motion therebetween. Brake 136 is engageable with braking surface 150 of the pressure plate to stop rotation of the driven member upon disengagement of the clutch. Engagement of the clutch is automatic in response to rotation of the driving member. Engagement of the brake is automatic in response to disengagement of the clutch. Rotation of driving member 122 in one direction 162 causes the automatic engagement of the clutch following the given amount of rotation and lost motion, whereafter the basket rotates, together with rotation of shaft 132. Rotation of driving member 122 in the direction opposite to arrow 162 provides disengagement of the clutch and engagement of the brake, whereafter only the agitator shaft rotates as driven by shaft 132, and the basket remains stationary due to brake engagement.

In FIG. 6, the clutching friction material 152 is bonded to lower flange 165 of top-hat structure 163 of clutch 126. In an alternate embodiment, FIG. 10, clutching material 252 is bonded to pressure plate 138 at friction surface 148. Furthermore, clutching friction material 252 is formed as a single piece with braking friction material 154 at connecting bridging material 253.

It is recognized that various equivalents, alternatives and modifications are possible within the scope of the appended claims.

We claim:
1. A drive mechanism comprising:
   a driving rotary member;
   a driven rotary member;
   a clutch operatively coupled between said driving member and said driven member and responsive to rotation of said driving member to automatically engage and rotate said driven member after a given amount of rotation of said driving member,
   wherein said driving member and said driven member are axially spaced, and said clutch comprises an axially movable clutch face having a released position axially spaced from said driven member, and having a driving position engaging said driven member, said clutch face being axially moved from said released position to said driving position by rotation of said driving member,
   an arcuate camming surface between said driving member and said clutch face such that rotation of said driving member axially cams said clutch face toward and into engagement with said driven member,
   wherein said cam surface comprises a release lobe at a high point, such that said camming surface cams said clutch face into engagement with and rotates said driven member before said lobe is reached, but if said driven member is stopped by a foreign object, said driving member may continue to rotate until said lobe is reached, whereafter said clutch face may move axially away from said driven member, whereby to protect a motive member driving said driving member.

2. The drive mechanism according to claim 1 wherein said driven member comprises a pressure plate axially movable toward and away from a load member, and a resilient biasing member biasing said pressure plate axially away from said load member and permitting movement of said pressure plate toward said load member upon cammed engagement by said clutch face, and providing take-up compensation permitting continued axial movement of said clutch face and pressure plate toward said load member if rotation of said driven member is stopped by said foreign object, until said lobe is reached, whereafter said clutch face and said pressure plate may move axially away from said load member under the bias of biasing member, whereby to protect said motive member, including an electric motor from burn-out.

3. A bidirectional drive comprising:

a driving rotary member;

a first driven rotary member;

a second driven rotary member;

a first drive operative in one rotary direction between said driving member and said first driven member, and responsive to one direction of rotation of said driving member to engage and rotate said first driven member after a given amount of rotation of said driving member in said one direction of rotation thereof;

a second drive responsive to rotation of said driving member to rotate said second driven member, wherein said first drive comprises a clutch face axially movable into engagement with said first driven member, and an adjustable camming surface adjustably controlling the degree of rotation in said given amount to in turn control an amount of lost motion of said driving member before clutched engagement with said first driven member, wherein said camming surface climbs along a profiled frontside to a high point lobe and then falls to a low point along a backside, and wherein said driving member in said one direction of rotation drives said first driven member along said camming surface frontside.

4. The bidirectional drive according to claim 3 comprising a pair of diametrically opposite said high point lobes, a pair of diametrically opposite said backsides, and a pair of inclined camming ramp frontsides extending from a respective low point at the bottom of a respective backside to a diametrically opposite high point lobe.

* * * * *